W. DE F. CROWELL.
WINDSHIELD FOR VEHICLES AND CONVEYANCES.
APPLICATION FILED DEC. 31, 1917.
1,385,204.
Patented July 19, 1921.
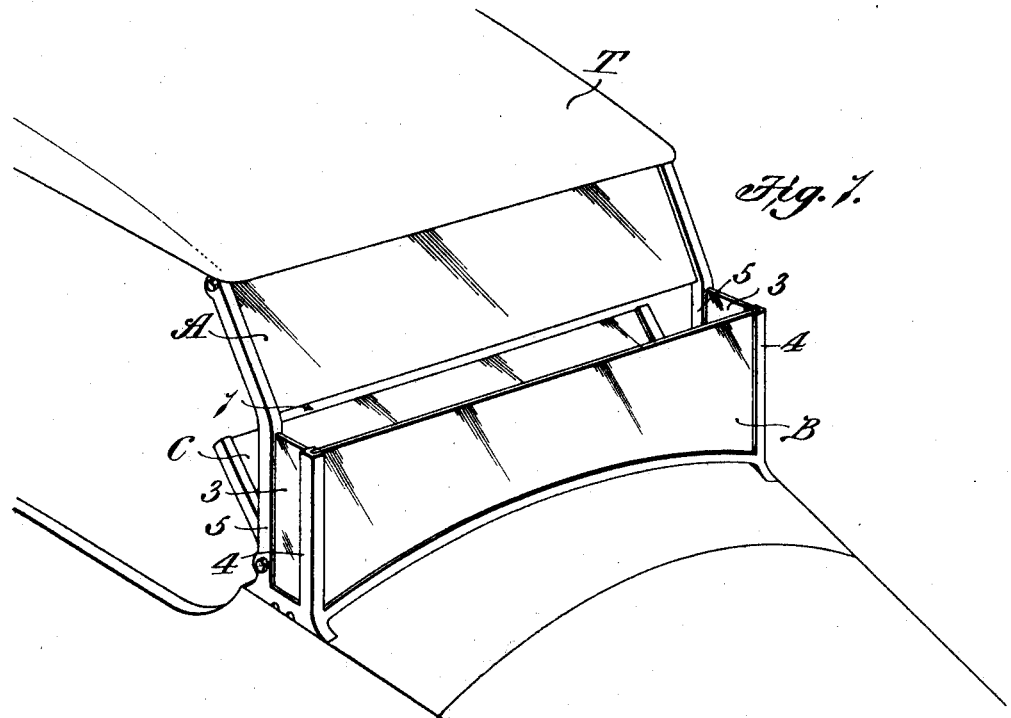
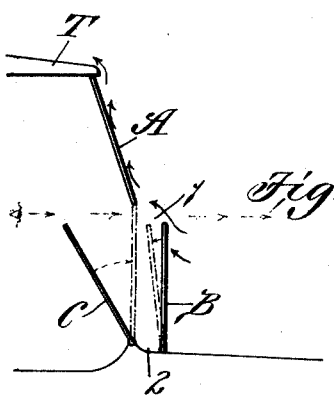
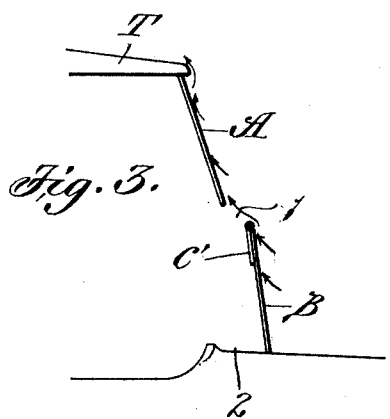
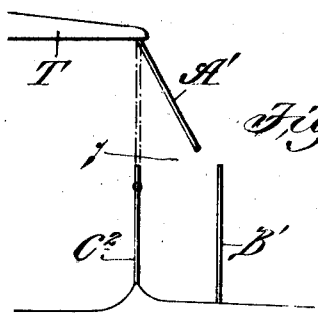
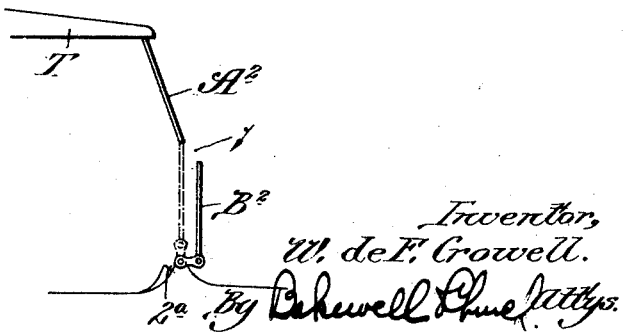
Inventor,
W. de F. Crowell.
By Bakewell & Cornwell Attys.

UNITED STATES PATENT OFFICE.

WILLIAM DE F. CROWELL, OF ST. LOUIS, MISSOURI.

WINDSHIELD FOR VEHICLES AND CONVEYANCES.

1,385,204. Specification of Letters Patent. Patented July 19, 1921.

Application filed December 31, 1917. Serial No. 209,738.

*To all whom it may concern:*

Be it known that I, WILLIAM DE F. CROWELL, a citizen of the United States, residing at St. Louis, Missouri, have invented a certain new and useful Improvement in Windshields for Vehicles and Conveyances, of which the following is a full, clear, and exact description, such as will enable others skilled in the art to which it appertains to make and use the same.

This invention relates to wind shields of the kind that are used on vehicles and conveyances for protecting the driver and the occupants of same. One type of wind shield that is now in general use on automobiles, particularly automobiles provided with closed bodies, consists of a glass wall constructed either in one piece or in sections so as to form a closure for the front of the vehicle that protects the driver from air currents, rain, etc., and a downwardly-inclined deflecting shield arranged in front of said glass wall and extending transversely across the upper half of same. The function of said downwardly-inclined deflecting shield is to prevent rain, snow and sleet from collecting on the upper half of the glass wall that serves as a closure for the front of the vehicle, but in actual practice said deflecting shield often fails to perform the function for which it is designed, thus resulting in the wind shield proper being covered with rain, snow and sleet which obstructs the vision of the driver.

Another type of wind shield that is now in general use on automobiles and other conveyances comprises two horizontally-divided sections adjustably mounted in a frame in such a manner that one or both of said sections can be moved so as to produce a slot or open space between the meeting edges of said sections that affords a clear vision for the driver, but wind shields of this latter type are not perfectly satisfactory, in that they permit air currents, rain, snow and sleet to pass through the open gap or slot between the two sections of the shield.

The main object of my invention is to provide a front wind shield for automobiles, motor boats, aeroplanes, street cars, locomotives and other conveyances, which has the following characteristics that are essential to a successful wind shield for vehicles or conveyances, namely, a clear vision for the driver or operator in charge of the vehicle in inclement weather and complete protection for the driver from air currents, rain, snow and sleet.

To this end I have devised a wind shield that comprises an upper member and a baffle arranged in such a manner that a horizontally-disposed gap, slot or open space is produced between said parts so as to afford a clear vision for the driver or operator in charge of the vehicle, said upper member and baffle being so positioned with relation to each other and the top or roof of the vehicle that when the vehicle is in motion a current of air will flow upwardly across the slot or open space between said parts, over the front side of the upper member and thence escape rearwardly over the top of the vehicle, thereby preventing dust or snow from blowing inwardly through said slot or open space. The particular construction of the upper member of the shield is immaterial, so far as my broad idea is concerned, but when the shield is designed for use on automobiles it is preferable to construct the upper member of glass or other suitable transparent material. The particular construction of the baffle is also immaterial, so far as my broad idea is concerned, but it is essential that said baffle be arranged in front of the upper member of the wind shield in a lower horizontal plane than same and positioned either vertically or with its upper edge inclined rearwardly. The vertical cross-sectional shape of the baffle is immaterial, so far as my broad idea is concerned. If desired, means can be provided for closing the open space or horizontal slot between the baffle and the upper member of the shield when the vehicle is not in motion and for protecting the driver of the vehicle from rain that drips downwardly from the lower edge of the upper member of the shield or which blows in through said slot when the vehicle is in use in rainy weather. The various parts of the shield can be formed from any suitable material and can be arranged in any suitable kind of frame or frames, either rigid or adjustable frames.

Figure 1 of the drawings is a perspective view of an automobile equipped with a wind shield constructed in accordance with my invention.

Fig. 2 is a vertical sectional view, illustrating the wind shield shown in Fig. 1; and Figs. 3, 4 and 5 are vertical sectional views, illustrating modifications of my invention.

Referring to Figs. 1 and 2 of the drawings, which illustrate one form of my invention, A designates the upper member of the shield which in the embodiment of my invention herein illustrated is formed of glass or some other suitable transparent material, and B designates a baffle arranged in front of said upper member A in a lower horizontal plane than same and so positioned with relation to the upper member A that a horizontally-disposed slot, gap or open space 1 is formed between the meeting edges of said parts. The upper member A is arranged in a rearwardly-inclined position, preferably with its upper edge terminating in close proximity to the front edge of the top T of the vehicle so as to permit the air which travels upwardly over the front side of said upper member to escape rearwardly over the top of the vehicle. The baffle B, which can be constucted either of opaque or transparent material, preferably the latter, can be arranged either in a vertical position, as shown in full lines in Fig. 2, or in a slightly rearwardly-inclined position, as shown in broken lines in said figure. When the vehicle is in motion the wind that strikes the front side of the baffle B will be deflected upwardly against the front side of the transparent top member A of the shield, as indicated by the arrows in Fig. 2, thus causing a current of air to circulate upwardly across the open space or gap 1, and thence escape rearwardly over the top T of the vehicle, the force of said current of air being strong enough to deflect or change the path of travel of any air currents, dust, or light snow that travels toward the horizontally-disposed gap or open space 1 in the shield. Consequently, a wind shield of the construction above described affords a clear vision for the driver or operator in charge of the vehicle, and it also completely protects the driver from air currents, dust, snow, etc., due to the fact that the current of air that circulates upwardly from the baffle B to the upper member A of the shield acts as a closure for the open space or gap 1 in the shield. The wind shield shown in Figs. 1 and 2 is provided with a lower portion C, formed either of opaque or transparent material, that is arranged behind the baffle B in such a manner that it protects the driver from any rain, snow or sleet which drips from the lower edge of the upper member A of the shield when the vehicle is in motion or which drives in through the gap 1, said lower portion C being preferably mounted in such a manner that it can be moved into the position shown in dotted lines in Fig. 2, so as to close the gap 1, and thus coöperate with the upper member A of the shield to form a wall or complete closure for the front of the vehicle.

In the form of my invention shown in Fig. 3 the baffle B of the shield is provided at its upper edge with a hinged section C' that can be swung upwardly into a position to close the gap 1 when the vehicle is not in motion. When the vehicle is in motion, the section C' is arranged in the position shown in full lines in Fig. 3, so as to afford a clear vision for the driver through the horizontally-disposed slot or open space 1. At such times any water that drips from the lower edge of the upper member A of the shield or which is blown in through the gap 1 is caught by the gutter 2 on the cowl of the body of the vehicle and is conducted away through said gutter to a point of discharge. In operation the wind shield shown in Fig. 3 is the same as the one shown in Fig. 2, the current of air that circulates upwardly across the gap 1, as indicated by the arrows in Fig. 3, serving to prevent wind, dust, snow, etc., from passing inwardly through said gap.

In Fig. 4 of the drawings I have illustrated my invention embodied in a type of wind shield now in general use, which comprises an upper member A' that can be swung forwardly into an inclined position in advance of the lower portion C² of the shield, thus forming an open space or slot 1 between the meeting edges of said upper member and lower portion. A baffle B' is arranged in front of the lower portion C² of the shield at a point in advance of the lower edge of the top member A' of the shield, so as to cause a current of air to circulate upwardly across the gap 1 when the vehicle is in motion.

In the form of my invention shown in Fig. 5 the baffle B² is mounted in such a manner that it can be moved forwardly into the position shown in full lines in said figure, so as to form a slot 1 between the upper edge of said baffle and the lower edge of the top member A² of the shield. At such times any water which drips from the top member A² of the shield or which is driven in through the gap 1 collects in the gutter 2ª and is conducted away to a point of discharge. If it is desired to close the gap or open space 1 in the shield, this can be accomplished easily by moving the baffle B² upwardly and rearwardly into the position shown in broken lines in Fig. 5, wherein it will be noted that the baffle B² coöperates with the top member A² of the shield to form a complete closure for the front of the vehicle.

In view of the fact that it is immaterial, so far as my invention is concerned, how the various parts of the shield are constructed and mounted, I have not herein illustrated the frames or supporting structures in which the parts of the shields shown in Figs. 3, 4 and 5 are carried. It will be noted that each of the forms of my invention illustrated in Figs. 3, 4 and 5 comprises the essential characteristics of the shield shown more in detail in Figs. 1 and 2, namely, an upper member and a baffle having its upper edge spaced away from said member so as to produce a horizontally-disposed gap or slot and also arranged in such a manner that the air which strikes the front side of said baffle when the vehicle is in motion will be deflected upwardly across said gap or slot, thus preventing air, dust, or light snow from entering the slot or open space in the shield that affords a clear vision for the person in charge of the vehicle or conveyance on which the shield is mounted.

In view of the fact that the baffle is arranged at a point in front of the upper member of the shield, it is desirable to provide the shield with means for preventing currents of air, rain and the like from flowing inwardly around the ends of the baffle and entering the vehicle. This can be accomplished in various ways without departing from the spirit of my invention, such, for example, as by providing the baffle with rearwardly-projecting portions 3, as shown in Fig. 1, that close the spaces between the frame 4 in which the baffle B is mounted and the lower part of the frame 5 of the wind shield in which the lower adjustable portion C of the shield is mounted. The same result could, of course, be accomplished by extending the side curtains of the vehicle forwardly and connecting them to the end portions of the baffle B.

Having thus described my invention, what I claim, and desire to secure by Letters Patent, is:

1. A wind shield for vehicles and conveyances, comprising a rearwardly-inclined upper member whose upper edge terminates in close enough proximity to the front edge of the top of the vehicle to permit the air which travels upwardly over the front side of said member to escape rearwardly over the top of the vehicle, a baffle arranged in advance of the bottom edge of said upper member with its top edge positioned far enough below the bottom edge of said upper member to form a clear vision slot, said baffle causing air to be deflected upwardly across said slot and onto the front side of said upper member, and means for protecting the operator of the vehicle from water that blows through said clear vision slot or which drips from the bottom edge of said upper member.

2. A wind shield for vehicles and conveyances, comprising a rearwardly-inclined upper member whose upper edge terminates in close enough proximity to the front edge of the top of the vehicle to permit the air which travels upwardly over the front side of said member to escape rearwardly over the top of the vehicle, a baffle arranged in advance of the bottom edge of said upper member with its top edge positioned far enough below the bottom edge of said upper member to form a clear vision slot, said baffle causing air to be deflected upwardly across said slot and onto the front side of said upper member, and a member arranged behind said baffle with its upper edge positioned below and at the rear of the bottom edge of the upper member of the shield so as to protect the operator from water that blows in through the clear vision slot or which drips from the bottom edge of the upper member of the shield.

3. A wind shield for vehicles and conveyances, comprising a rearwardly-inclined upper member whose upper edge terminates in close enough proximity to the front edge of the top of the vehicle to permit the air which travels upwardly over the front side of said member to escape rearwardly over the top of the vehicle, a baffle arranged in advance of the bottom edge of said upper member with its top edge positioned far enough below the bottom edge of said upper member to form a clear vision slot, said baffle causing air to be deflected upwardly across said slot and onto the front side of said upper member, and means for preventing wind, rain and the like from blowing inwardly around the ends of said baffle.

WILLIAM DE F. CROWELL.